(12) United States Patent
Nyström et al.

(10) Patent No.: US 11,363,201 B2
(45) Date of Patent: Jun. 14, 2022

(54) STATISTICS-BASED ELECTRONIC IMAGE STABILIZATION

(71) Applicant: Axis AB, Lund (SE)

(72) Inventors: Johan Nyström, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/237,246

(22) Filed: Apr. 22, 2021

(65) Prior Publication Data

US 2021/0337123 A1 Oct. 28, 2021

(30) Foreign Application Priority Data

Apr. 28, 2020 (EP) ..................................... 20171714

(51) Int. Cl.
*H04N 5/232* (2006.01)
*G06T 7/11* (2017.01)

(52) U.S. Cl.
CPC ........... *H04N 5/23267* (2013.01); *G06T 7/11* (2017.01); *H04N 5/23258* (2013.01); *G06T 2207/20132* (2013.01)

(58) Field of Classification Search
CPC ................................................ H04N 5/23267
See application file for complete search history.

(56) References Cited

U.S. PATENT DOCUMENTS 5,107,293 A * 4/1992 Sekine ............... H04N 5/23283
396/233
5,581,297 A 12/1996 Koz et al.
2012/0327254 A1 12/2012 Iwahashi
2013/0083192 A1 4/2013 Strine et al.
2016/0344935 A1 11/2016 Ardo
2017/0011529 A1 1/2017 Urashita
2018/0376054 A1 12/2018 Patel et al.
2019/0335074 A1 10/2019 Malkes et al.

FOREIGN PATENT DOCUMENTS

EP 2023223 A1 2/2009

OTHER PUBLICATIONS

Extended European Search Report dated Nov. 26, 2020 for European Patent Application No. 20171714.7.

* cited by examiner

*Primary Examiner* — Cynthia Segura
(74) *Attorney, Agent, or Firm* — Volpe Koenig

(57) ABSTRACT

Methods and apparatus, including computer program products, for selecting a cropping area in a sequence of images captured by a camera. First external motion data including data of external factors affecting movement of the camera is correlated with internal motion data describing a movement of the camera. The first external motion data and the internal motion data are obtained during a first time interval. Second external motion data is obtained during a second time interval subsequent to the first time interval. A sequence of images being captured during a third time interval is stabilized by selecting a cropping area based on the correlation and the second external motion data. The cropping area remains constant and maximized in size with respect to the field of view of the images during the third time interval. The third time interval is subsequent to, or partly overlapping with, the second time interval.

13 Claims, 3 Drawing Sheets

STATISTICS-BASED ELECTRONIC IMAGE STABILIZATION

BACKGROUND

The present invention relates to cameras, and more specifically to electronic image stabilization of a sequence of images captured by a camera.

Monitoring cameras that are used for monitoring a scene are often placed in outdoor (and sometimes indoor) locations where they get subjected to vibrations due to different causes. For example, a sudden gust of wind might shake the camera, or a train or heavy truck passing close by might have similar effects. These vibrations can sometimes render the video output by the camera blurry, such that the video is more or less useless for practical purposes. Improvements in video quality have made the problem with blurry images more apparent. Increasing pixel density, higher resolution and more powerful zooming capabilities have not only made cameras more sensitive to vibrations, but have also made viewers more susceptible and prone to noticing them.

One technique for reducing vibration is to use sturdier mounts or less exposed locations for the camera installation. Two other techniques are Optical Image Stabilization (OIS) and Electronic Image Stabilization (EIS), both of which are implemented in the camera itself rather than in its physical surroundings. An OIS system usually relies on gyroscopes or accelerometers in the camera to detect and measure camera vibrations, and then move the lens or the optical sensor to compensate for the shaking of the camera and lens, so that light can strike the image sensor in the same fashion as if the camera was not vibrating.

EIS has primarily been developed for video cameras. EIS relies on different algorithms for modeling camera motion, which then are used to correct the images. Pixels outside the border of the visible image are used as a buffer for motion, and the information in these pixels can then be used to slightly shift the electronic image from frame to frame, a sufficient amount to counterbalance the motion and create a stream of stable video. In order to activate EIS on a sequence of images captured by a camera, each image needs to be cropped, such that the out-of-frame pixels, sometimes also referred to as black pixels, are not introduced into the image when performing the EIS.

If the camera is moving, for example, due to wind or ground vibrations, in one or more of the pitch, jaw, or roll directions, compensation for such pitch, jaw, or roll movement may also be needed. However, such compensation may lead to different ways of cropping the image as compared to the cropping that is done for purposes of avoiding the introduction of out-of-frame pixels, as mentioned above. Thus, there is a need for better techniques to allow balancing of EIS modes and possible pitch, jaw and roll movements, when determining how to crop the images. This is especially important when it is desired that the cropping, that is, the cropping area, is a stable range of the field of view of the image in the sequence of images.

SUMMARY

According to a first aspect, a method, in a computer system, for selecting a cropping area in a sequence of images captured by a camera includes:
  a. correlating first external motion data with internal motion data, wherein the first external motion data and the internal motion data are obtained during a first time interval, wherein the first external motion data comprises data of external factors affecting movement of the camera and wherein the internal motion data comprises data describing a movement of the camera;
  b. obtaining second external motion data during a second time interval subsequent to the first time interval; and
  c. stabilizing a sequence of images being captured during a third time interval, the third time interval being either subsequent to the second time interval or partly overlapping with the second time interval, by selecting a cropping area based on the correlation and the second external motion data, wherein the cropping area remains constant and maximized in size with respect to the field of view of the images in the sequence of images captured by the camera during the third time interval.

On a general level, image stabilization makes the entire video surveillance system more versatile and cost efficient by making better use of each camera's potential, for example by maintaining image quality in zoom shots when vibrations otherwise may have affected the video quality. More specifically, a camera user is provided with a way of correlating external factors, such as wind, vibrations, etc., with internal readings from sensors in the camera. Knowing how external vibrations affect the internal sensor readings, together with knowing what kind of cropping is needed in response to certain sensor readings, it is possible to predict in a sense what kind of cropping will be needed in response to the external factors, and preemptively making any such adjustments.

Expressed differently, by using the techniques set forth hereinafter, it is possible to dynamically adjust the image cropping, such that the cropping area remains constant and maximized in size with respect to the field of view of the images in the sequence of images captured by the camera during a certain period of time, which may be predetermined or be dynamically defined by a user or by the circumstances at hand. For example, if heavy winds are predicted, the margin may be increased such that the margin is larger and there is more room to compensate for vibrations. On the other hand, during a calmer day, it may be possible to allow for a smaller margin, as the camera will remain fairly stable throughout the day. As a consequence of having these dynamic margins, there are more "usable" pixels in the image that are available for various types of image processing, compared to conventional methods in which a predetermined margin of pixels around the image is used.

According to one embodiment, the first and second time intervals, respectively, are approximately 15 minutes or longer. The first and second times serve to collect amount of data that is statistically significant, such that a clear picture emerges of the external and internal motion data, respectively. Typically, this depends on the granularity of the data patterns, which are captured by the external motion sensor. Sometimes, a few minutes might be sufficient, and under other circumstances, it the data collection may happen over the course of hours, days, weeks, months, or even years to obtain a statistically significant dataset.

According to one embodiment, correlating of the first external motion data with the internal motion data comprises: for each point in time when a sensor readout occurs in the first time interval, correlating a respective first external motion datum with a corresponding internal motion datum. This makes it possible to find an exact correspondence at any given point in time between an internal and an external sensor readout, and to build statistically significant datasets and correlations between internal and external motion data.

According to one embodiment, obtaining the second external motion data comprises: obtaining the second external motion data as a prediction based on the first external motion data and a prediction model. That is, the second motion data does not have to be obtained directly from a set of sensors, but can be based on the first motion data and a prediction model. For example, a weather forecast may predict 30 knot winds, and the first motion data may contain information about how the camera has behaved in the past at the same wind speed and wind direction. Then, it would be reasonable to expect the camera to behave in a similar way during the upcoming forecast period, and use that information as the second external motion data for the upcoming period. Thus, it is possible to not only rely on current sensor readings, but also on historical sensor readings in combination with a prediction model. This also makes the system more robust in the event of possible problems with sensors measuring external motion data, or the transmission of such data.

According to one embodiment, the first and second external motion data includes wind data and/or ground vibration data, and the internal motion data includes gyro data, accelerometer data, and/or motion estimation by image processing. These are some examples of common types of data that affects the movement of the camera. However, it should be realized that it is not an exhaustive list and that there are other factors too (e.g., large hail hitting the camera during a hail storm), which may cause the camera to move.

According to one embodiment, the motion estimation by image processing is done using a digital image stabilization algorithm. That is, pixels are analyzed to determine how much they move, for example, in a horizontal and a vertical direction, respectively, and an offset is calculated, which is used to stabilize the image. There are several known algorithms for performing digital image stabilization, such as a Sum of Absolute Differences (SAD) algorithm, for example. Using digital image stabilization avoids the need of internal motion sensors such as gyroscopes, etc., in the camera.

According to one embodiment, obtaining of the first and second external motion data, respectively, comprises: receiving the first and second external motion data, respectively, from a motion sensor and/or an external weather service. That is, the first and second external motion data can either come from a motion sensor. Typically, such a motion sensor would be installed in close proximity to the camera, such that it would closely mirror the conditions of the camera. Alternatively, the data can come from a weather service, which eliminates the need of having to install and maintain sensors close to the camera, and instead rely on local weather stations in the vicinity. Depending on the specific circumstances, either approach may be preferable, or sometimes a combination of both approaches for obtaining first and second external motion data can be used.

According to one embodiment, the motion sensor includes a wind sensor, a ground vibration sensor, or a second camera. These are all sensors that can be used to determine external motion. Wind sensors and ground vibration sensors exist in many forms that are commercially available, and their functionalities are well known to those having ordinary skill in the art. A second camera can be used to determine external motion data. For example, the second camera can be a camera configured to read the License Plate on a passing truck and based on that information obtain information about the vehicle, such as its size, from a database. This information can be used as input to another camera, for example, for purposes of traffic monitoring, where image stabilization is an important feature.

According to one embodiment a recommendation is provided, based on the second external motion data and the correlation, about whether image stabilization should be based on one or more of: pitch, jaw, and roll. Different types of vibrations cause the camera to move in different ways. For example, a train or truck moving past the camera may cause a vibration that is primarily vertical. On the other hand, a heavy gust of wind might cause a vibration or displacement that is primarily horizontal, etc. In some situations, for example, when a camera is mounted on a pole that sways in the wind, compensation for roll may also be needed. Therefore, it is beneficial to have different types of image stabilization available. These different types can be based on different types of camera movement, such as pitch, jaw and roll. Based on the second external motion data and the correlation, a recommendation can be made as to which type of image stabilization would be the most appropriate in a given situation.

According to one embodiment, in response to detecting a change in second external motion data that exceeds a predetermined threshold, a different cropping area is selected based on the correlation and the changed second external motion data. For example, assume that a certain cropping area is selected and then the wind suddenly kicks up or slows down. If the changes are reasonably small, no change is made to the cropping area. However, if the changes are substantial, i.e., they increase a predetermined threshold, then the cropping area may be changed due to the changed movement of the camera. Having the ability to make such changes ensures that the cropping area remains maximized in size at all times, while maintaining good image quality.

According to one embodiment, selecting a cropping area further takes into account a variable stabilizer margin that is dependent on the field of view of the images in the sequence of images. That is, a stabilizer margin may be defined, which changes with current field of view. For example, in some products or installations there may be a decreased need for image stabilization in a wide angle capture mode, and an increased need for image stabilization in a telephoto capture mode. In such a scenario, the maximum margin can be adjusted based on the current field of view. One example of this is a wide zoom lens camera, where the angle for the horizontal field of view may vary from, say, 90 to 30 degrees. In such a scenario, small vibrations will have very little impact on the image quality at the 90-degree view. However, but if zooming in to a 30-degree view, there will be a noticeable shaking and the maximum margin needs to be set higher to accommodate that. The range between a minimum and a maximum size of the stabilizer margin can either be preconfigured or determined by a user based on the particular camera installation environment. According to a second aspect, a system selects a cropping area in a sequence of images captured by a camera. The memory contains instructions that when executed by the processor causes the processor to perform a method that includes:

a. correlating first external motion data with internal motion data, wherein the first external motion data and the internal motion data are obtained during a first time interval, wherein the first external motion data comprises data of external factors affecting movement of the camera and wherein the internal motion data comprises data describing a movement of the camera;

b. obtaining second external motion data during a second time interval subsequent to the first time interval; and c. stabilizing a sequence of images being captured during a third time interval, the third time interval being either subsequent to the second time interval or partly overlapping with the second time interval, by selecting a cropping area based on the correlation and the second external motion data, wherein the cropping area remains constant and maximized in size with respect to the field of view of the images in the sequence of images captured by the camera during the third time interval.

The system advantages correspond to those of the method and may be varied similarly.

According to a third aspect, a computer program for selecting a cropping area in a sequence of images captured by a camera contains instructions corresponding to the steps of:
 a. correlating first external motion data with internal motion data, wherein the first external motion data and the internal motion data are obtained during a first time interval, wherein the first external motion data comprises data of external factors affecting movement of the camera and wherein the internal motion data comprises data describing a movement of the camera;
 b. obtaining second external motion data during a second time interval subsequent to the first time interval; and
 c. stabilizing a sequence of images being captured during a third time interval, the third time interval being either subsequent to the second time interval or partly overlapping with the second time interval, by selecting a cropping area based on the correlation and the second external motion data, wherein the cropping area remains constant and maximized in size with respect to the field of view of the images in the sequence of images captured by the camera during the third time interval.

The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
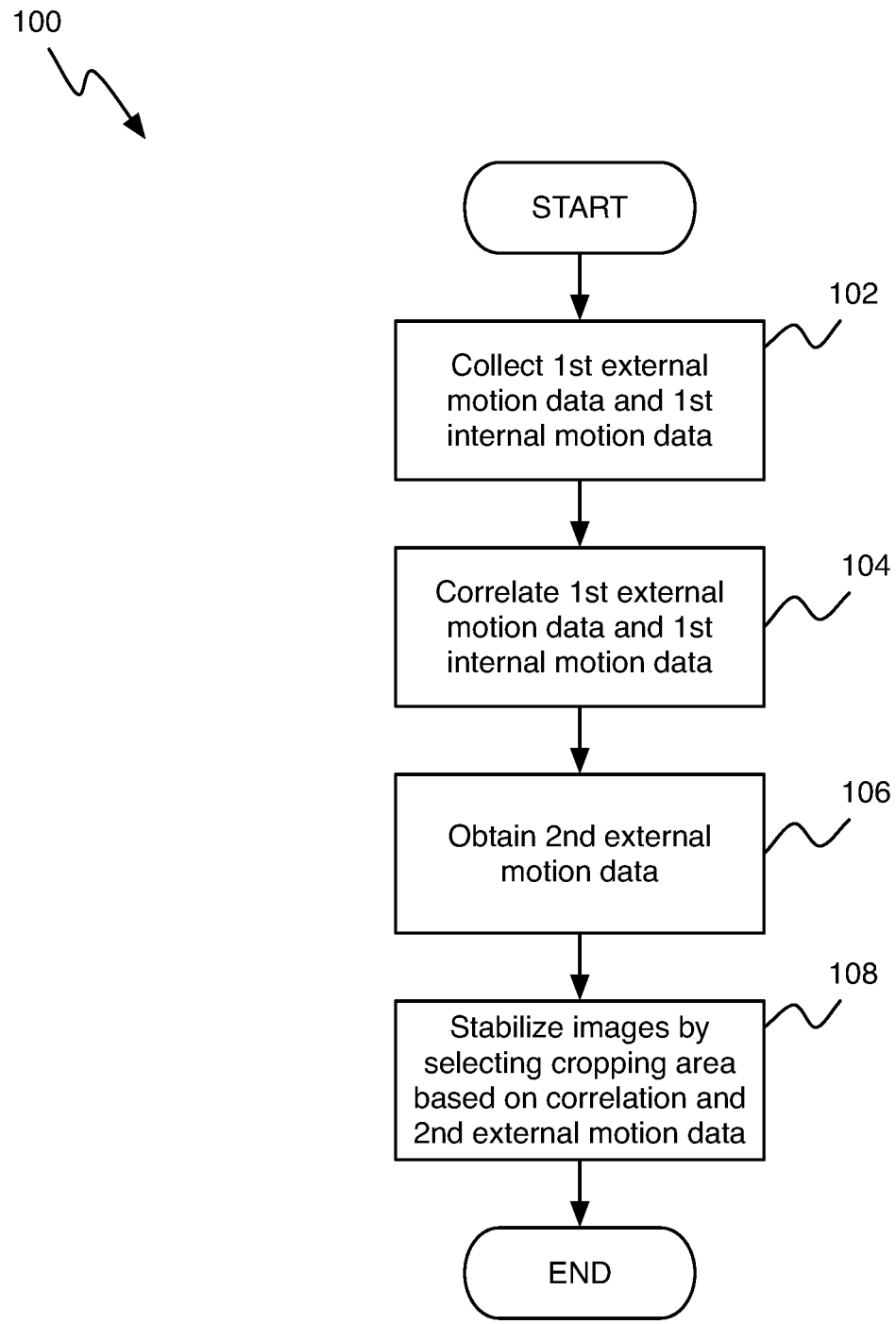
FIG. 1 shows a process for selecting a cropping area, in accordance with one embodiment.
Figure 2:
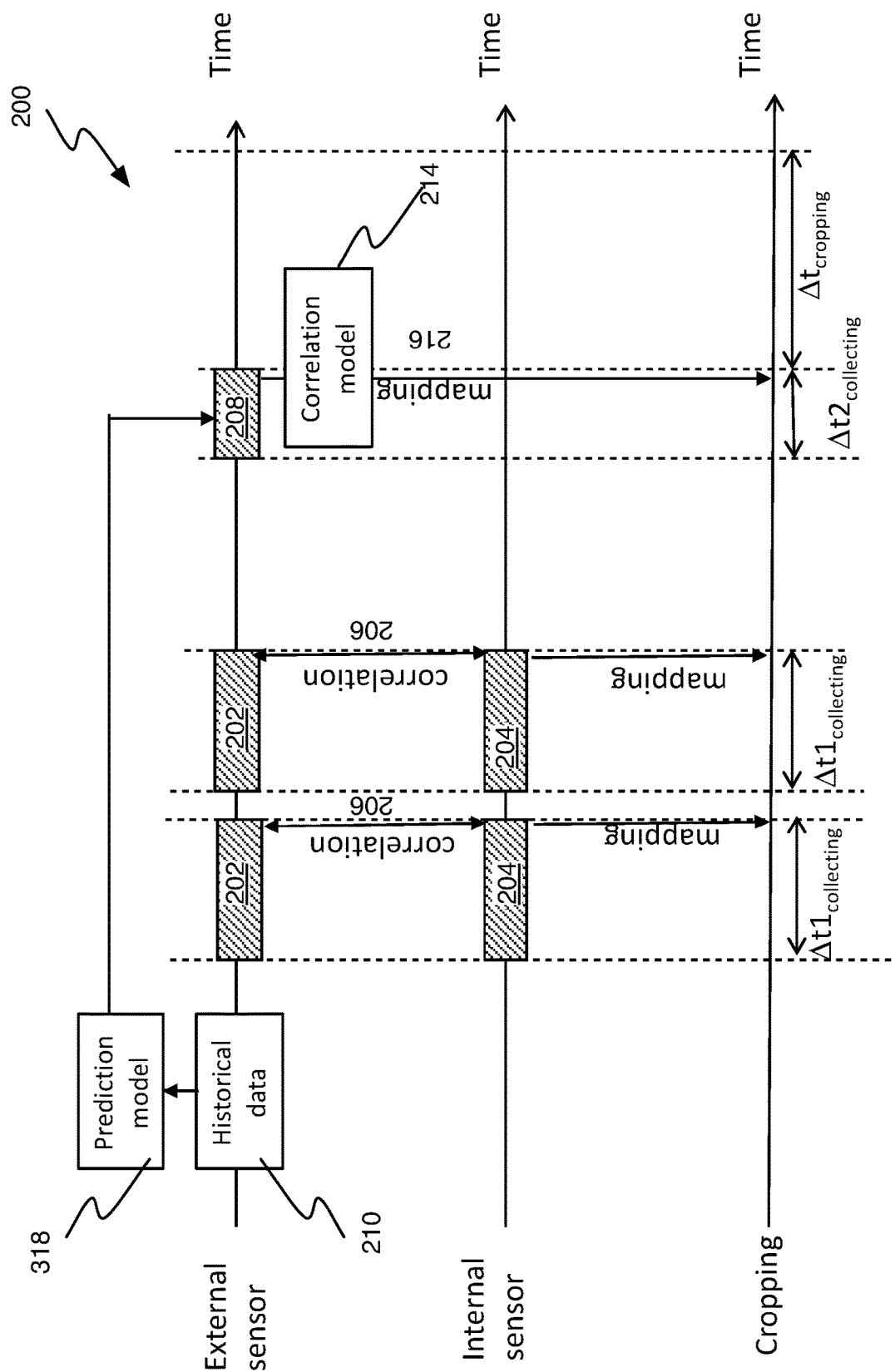
FIG. 2 shows a schematic diagram 200 of how external sensor data and internal sensor data is used to select a cropping area, in accordance with one embodiment.
Figure 3:
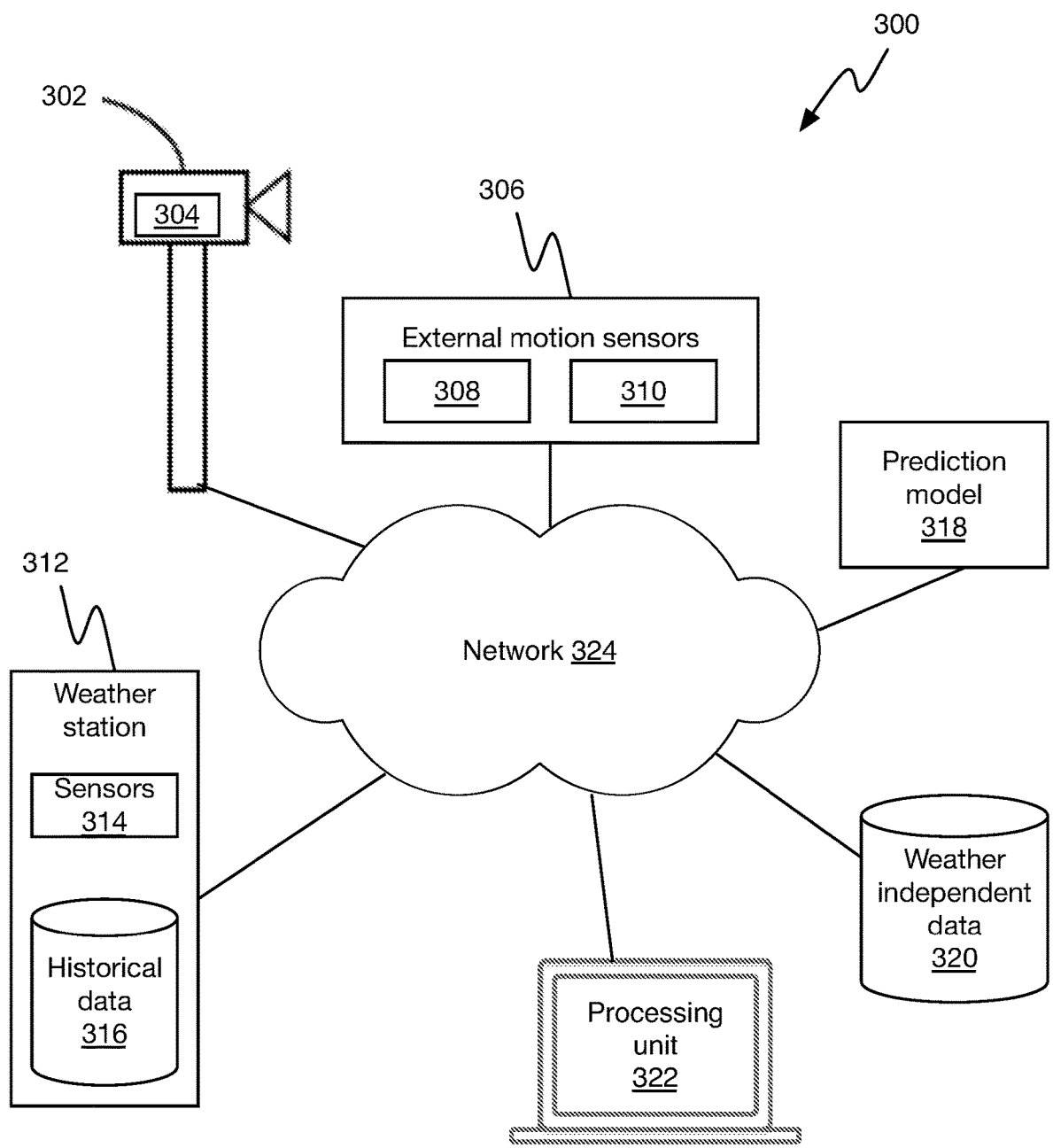
FIG. 3 is a schematic block diagram 300 showing a system in accordance with one embodiment.

As was described above, various embodiments provide techniques for dynamically selecting a cropping area in a sequence of images, such as a video sequence, captured by a camera, in order to perform better EIS compared to conventional systems in which the cropping area is fixed or changes based on focal length. Being able to dynamically select a cropping area allows the cropping area to be maximized, thereby maximizing the pixel density (and the resolution) of the captured images. Various embodiments will now be described in detail by way of example and with reference to the drawings, in which FIG. 1 shows a process 100 for selecting a cropping area, in accordance with one embodiment, FIG. 2 shows a schematic diagram 200 of how external sensor data and internal sensor data is used to select a cropping area, in accordance with one embodiment, and FIG. 3 shows a schematic block diagram 300 of a system which can be implemented, in accordance with one embodiment.

In order to better understand the context of the teachings set forth hereinafter, a brief explanation of the example system 300 will first be presented. The individual system components and their operation will then be described in further detail with respect to FIGS. 1 and 2. As can be seen in FIG. 3, the system 300 includes a camera 302, which captures video and for which it is desired to perform image stabilization. The camera 302 includes one or more internal motion sensors 304, such as a gyroscope and/or accelerometer, which measure internal motion of the camera. The system 300 further includes a set of external motion sensors 306, such as a wind sensor 308 and a ground vibration sensor 310, which measure motion external to the camera 302. Typically, these external motion sensors 306 are located in close proximity of the camera 302.

The system 300 further includes a weather station 312. The physical location of the weather station 312 with respect to the camera 302 can vary. The weather station 312 includes sensors 314, for example, a wind sensor, to measure current conditions. In some implementations, the weather station 312 also has access to historical data 316.

In some embodiments, a prediction model 318 form part of the system 300. The prediction model 318 will be explained below in further detail, but essentially operates in conjunction with the historical data 316 to "forecast" how the camera 302 will move under certain conditions. Further, as will be described below, in some situations, there may be camera movements that are not weather dependent (e.g., trains passing by a platform with a camera 302 on a regular schedule). Such weather-independent data can also be part of the system 300.

Lastly the system 300 includes a processing unit 322, which performs the data processing as will be described below. All these system components communicate with each other over a network 324, which may be a wired network, a wireless network, or a combination thereof. The communication can use standard or proprietary communication protocols. It should also be noted that while only one system component of each kind is shown in FIG. 3, for ease of illustration purposes, in a real-life implementation, there may be several components. For example, there may be several weather stations 312 or external motion sensors 306 that provide data to a single camera 302, or even to a group of cameras 302. Thus, the system embodiment 300 shown in FIG. 3 should not be construed as to the number and types of system components.

As can be seen in FIG. 1, the process 100 starts by collecting first external motion data 202 and first internal motion data 204, step 102. The first external motion data 202 is collected from one or more external motion sensors during a first time interval, $\Delta t1_{collecting}$, as shown in FIG. 2. The external motion data 202 includes data representative of external factors, such as wind direction, wind speed, and ground vibration, which may all affect movement of the camera. It should be noted that this is not an exclusive list, and that there may be other factors too that can affect movement of the camera, for example, large hail, as described above. The sensors and associated methods that are used to collect the external motion data 202 can be selected from a variety of commercially available sensors that are well known to those having ordinary skill in the art.

While collecting the first external motion data 202, internal motion data 204 is also collected during the first time interval. The internal motion data 204 is collected from one or more internal motion sensors in the camera, such as a camera gyroscope or accelerometer, which are common components in many cameras. In some implementations, the internal motion data 204 can also be derived by analyzing the movement of pixels and determining an image processing motion vector estimate, in which case there would not be any need for having internal motion sensors in the camera.

The first time interval can vary greatly, from minutes to days, weeks, months or even years in order to obtain statistical data sets that can be employed when using the method of the various embodiments. It should also be noted that the first time interval may be followed by one or more additional first time intervals, as illustrated in FIG. 2. For example, collecting vibration data from a train that passes by the camera installation is typically a very short and predictable situation, whereas collecting data on a day with gusty winds may require a longer period of data collection in order to obtain an average wind speed value.

Next, a correlation 206 is made between the first external motion data 202 and the first internal motion data 204, step 104. That is, a first external motion datum, taken at a particular point in time, is correlated with a first internal motion datum, taken at the same point in time. For example, a wind sensor reading and/or the ground vibration sensor reading obtained at one point in time in the first time interval is correlated with a gyro reading obtained at the same point of time in the first time interval. Thus, for the same point in time, there will be a mapping between the external motion sensor datum and the internal motion sensor datum.

It should be noted that the correlation is not limited to a one-to-one correspondence of sensor readings. For example, at a given point in time there may be one readout from the gyro, but that readout could be correlated to both a wind direction and a wind speed occurring at the same point in time. Similarly, different sensors may support different sampling frequencies. For example, an internal gyro in the camera can be sampled at several hundred times per second, while an external wind sensor may only allow sampling once per second. Thus, there are many different ways in which data can be correlated depending on the specific circumstances at hand. The main point, however, is the same. That is, to create a correlation between how an external sensor reading maps to an internal sensor reading.

Further, it should be noted that while many cameras have internal sensors, such as gyroscopes or accelerometers, there are also many cameras that lack these components. In such situations, an alternative to the internal sensors can be to determine the motion of the camera by image processing. This is typically referred to as Digital Image Stabilization (DIS). Briefly, in a DIS implementation, pixels are analyzed to determine how much they move, for example, in a horizontal and a vertical direction, respectively. An offset is calculated, which is used to stabilize the image. There are several known methods for performing DIS, which are well known to those having ordinary skill in the art, such as a Sum of Absolute Differences (SAD) algorithm, for example.

Next, second external motion data 208 is obtained, step 106. Typically, this is done using the same techniques that were described above in conjunction with step 102 and during a second time interval, $\Delta t2_{collecting}$, that is subsequent to the first time interval $\Delta t1_{collecting}$. However, there are also embodiments in which the second external motion data 208 is not collected by sensor at the specific site of the camera, but instead obtained through a different process. For example, the second external motion data 208 can be obtained from an external station, such as an external weather station. For example, it may be possible to receive wind statistics for a certain period of time, e.g., the second time interval, from the weather station. Further, it may be possible to receive historical external motion data 210 (denoted 316 in FIG. 3), e.g. historical wind statistics, e.g. from a period of time preceding the second time interval $\Delta t2_{collecting}$. The historical external motion data 210,316 may be used together with a prediction model 318 to predict the external motion data of second time interval $\Delta t2_{collecting}$. Furthermore, the external motion data may be mapped to a timetable, e.g. a train timetable. This may for example be the case when the camera is installed at a railway platform and it is desirable to map the train timetable to ground vibrations caused by a train arriving, departing, or simply passing by. Thus, there are a variety of ways in which the second motion data 208 can be obtained.

The process ends by stabilizing a series of images captured during a third time interval by selecting a cropping area based on the correlation and the second external motion data, step 108. In conventional systems, it is known how each internal motion datum, e.g., each gyro reading, matches a specific cropping, e.g., a specific cropping area, of the captured image. Thus, by using the correlation 206 between the first external motion data 202 and the first internal motion data 204, a correlation model 214 can be built, which can be applied to the second external motion data 208 directly. By applying the correlation model 214 to the external motion data 208, it is possible to map the external motion data 208 directly to a suitable cropping area for images captured during a third time interval, $\Delta t_{cropping}$, as shown in FIG. 2. The third time interval can be totally separate from, or partly overlapping with, the second time interval. Just like the first and second time intervals, respectively, the third time interval can range from minutes, to hours, days, or weeks.

It should be noted that during the third time interval, no internal motion data is needed for the cropping since the second external motion data 208 is statistically processed, and, by means of the correlation model 214, mapped 216 to one single cropping to be used in image stabilization during the third time interval.

An advantage of using the same single cropping when performing image stabilization during the third time interval, is that the pixel size of the cropped images will remain the same during the third time interval. Thereby, all the images captured and stabilized during the third time interval will have the same resolution. Typically, the cropping is not changed very frequently, as it affects the zooming of the camera and having a very "reactive" cropping would create a very "jerky" image stream for a user watching the video from the camera with a lot of unnecessary zooming in/out. Too frequent zooming may also have a negative impact on the functioning of certain image analytics applications. In many embodiments, it is preferable to change the zooming only 1-2 times per 24 hour period, although, of course a large variation is possible also here.

In one embodiment, the determined single cropping area is selected as large as possible within the field of view of the images of the sequence of images. That is, the cropping area for third time interval is maximized to fit a percentage of the captured images. Thus, if the second external motion data includes one or more outliers, e.g., one or more data indicating very large movement or vibration, these outliers may be disregarded when determining the cropping area. In such cases, images captured during this large movement or vibration of the camera, may be stabilized with the determined cropping area, although it may not be an optimal cropping area for these particular images. However, the cropping area may still optimally stabilize 95%-99% of the captured images during the third time interval, and still provide significant advantages compared to conventional EIS methods. Further, an advantage of maximizing the cropping area is that the pixel density also is maximized. Thereby, the image resolution and image quality are also maximized.

In some embodiments, in addition to determining the cropping area, the collected external motion data 208 and the prediction model 318 can also be used to determine how much the camera is likely to move or vibrate at a future point in time. This information can then be used by the camera system to suggest whether roll should be activated, or whether the camera should only perform image stabilization based on pitch and jaw.

Further, in some embodiments, the camera system may suggest the range of stabilization, i.e. the range of the field of view used as cropping area. Based on pieces of information, the camera system may suggest a suitable EIS mode. In some embodiments, further factors can also be taken into account when proposing an EIS mode. For example, there may be situations in which it the EIS mode could vary depending on the season (e.g., one EIS mode for a hot summer day vs. another EIS mode for a cold snowy day), the time of day (e.g. one EIS mode for the daytime when there is a lot of traffic and a different EIS mode for the night time when things are relatively quiet). As can be seen, there are many variations that can be implemented by persons having ordinary skill in the art and based on the particular situation at hand.

The systems and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages as shown in the embodiments above. Thus, the teachings should not be limited to the shown embodiments but should only be defined by the appended claims. Additionally, as the skilled person understands, the shown embodiments may be combined.

The invention claimed is:

1. A method for selecting a cropping area in a sequence of images captured by a camera, comprising:
   correlating first external motion data with internal motion data, wherein the first external motion data and the internal motion data are obtained during a first time interval, wherein the first external motion data comprises data of external factors affecting movement of the camera and wherein the internal motion data comprises data describing a movement of the camera;
   obtaining second external motion data during a second time interval subsequent to the first time interval; and
   stabilizing a sequence of images being captured during a third time interval, the third time interval being either subsequent to the second time interval or partly overlapping with the second time interval, by selecting a cropping area based on the correlation and the second external motion data, wherein the cropping area remains constant and maximized in size with respect to the field of view of the images in the sequence of images captured by the camera during the third time interval.

2. The method of claim 1, wherein the first and second time intervals, respectively, are approximately 15 minutes or longer.

3. The method of claim 1, wherein the correlating of the first external motion data with the internal motion data comprises:
   for each point in time when a sensor readout occurs in the first time interval, correlating a respective first external motion datum with a corresponding internal motion datum.

4. The method of claim 1, wherein obtaining the second external motion data comprises:
   obtaining the second external motion data as a prediction based on the first external motion data and a prediction model.

5. The method of claim 1, wherein:
   the first and second external motion data includes one or more of: wind data and ground vibration data, and
   the internal motion data includes one or more of: gyro data, accelerometer data, and motion estimation by image processing.

6. The method of claim 5, wherein the motion estimation by image processing is done using a digital image stabilization algorithm.

7. The method of claim 1, wherein the obtaining of the first and second external motion data, respectively, comprises:
receiving the first and second external motion data, respectively, from one or more of: a motion sensor and an external weather service.

8. The method of claim 7, wherein the motion sensor includes one of: a wind sensor, a ground vibration sensor, and a second camera.

9. The method of claim 1, further comprising:
providing a recommendation, based on the second external motion data and the correlation, about whether image stabilization should be based on one or more of: pitch, jaw, and roll.

10. The method of claim 1, further comprising:
in response to detecting a change in second external motion data that exceeds a predetermined threshold, selecting a different cropping area based on the correlation and the changed second external motion data.

11. The method of claim 1, wherein selecting a cropping area further considers a variable stabilizer margin that is dependent on the field of view of the images in the sequence of images.

12. A system for selecting a cropping area in a sequence of images captured by a camera, comprising:
a camera including one or more internal motion sensors;
one or more sensors configured to measure external factors affecting movement of the camera; and
a processing unit including a memory and a processor, wherein the memory contains instructions that when executed by the processor causes the processor to perform a method that includes:
correlating first external motion data with internal motion data, wherein the first external motion data and the internal motion data are obtained during a first time interval, wherein the first external motion data comprises data of external factors affecting movement of the camera and wherein the internal motion data comprises data describing a movement of the camera;
obtaining second external motion data during a second time interval subsequent to the first time interval; and
stabilizing a sequence of images being captured during a third time interval, the third time interval being either subsequent to the second time interval or partly overlapping with the second time interval, by selecting a cropping area based on the correlation and the second external motion data, wherein the cropping area remains constant and maximized in size with respect to the field of view of the images in the sequence of images captured by the camera during the third time interval.

13. A computer program product for selecting a cropping area in a sequence of images captured by a camera, comprising a computer readable storage medium having program instructions embodied therewith, wherein the computer readable storage medium is not a transitory signal, the program instructions being executable by a processor to perform a method comprising:
correlating first external motion data with internal motion data, wherein the first external motion data and the internal motion data are obtained during a first time interval, wherein the first external motion data comprises data of external factors affecting movement of the camera and wherein the internal motion data comprises data describing a movement of the camera;
obtaining second external motion data during a second time interval subsequent to the first time interval; and
stabilizing a sequence of images being captured during a third time interval, the third time interval being either subsequent to the second time interval or partly overlapping with the second time interval, by selecting a cropping area based on the correlation and the second external motion data, wherein the cropping area remains constant and maximized in size with respect to the field of view of the images in the sequence of images captured by the camera during the third time interval.

* * * * *